March 26, 1929.  E. C. KRUEGER  1,707,085
FISHING TOOL FOR USE IN WELLS
Filed May 3, 1928
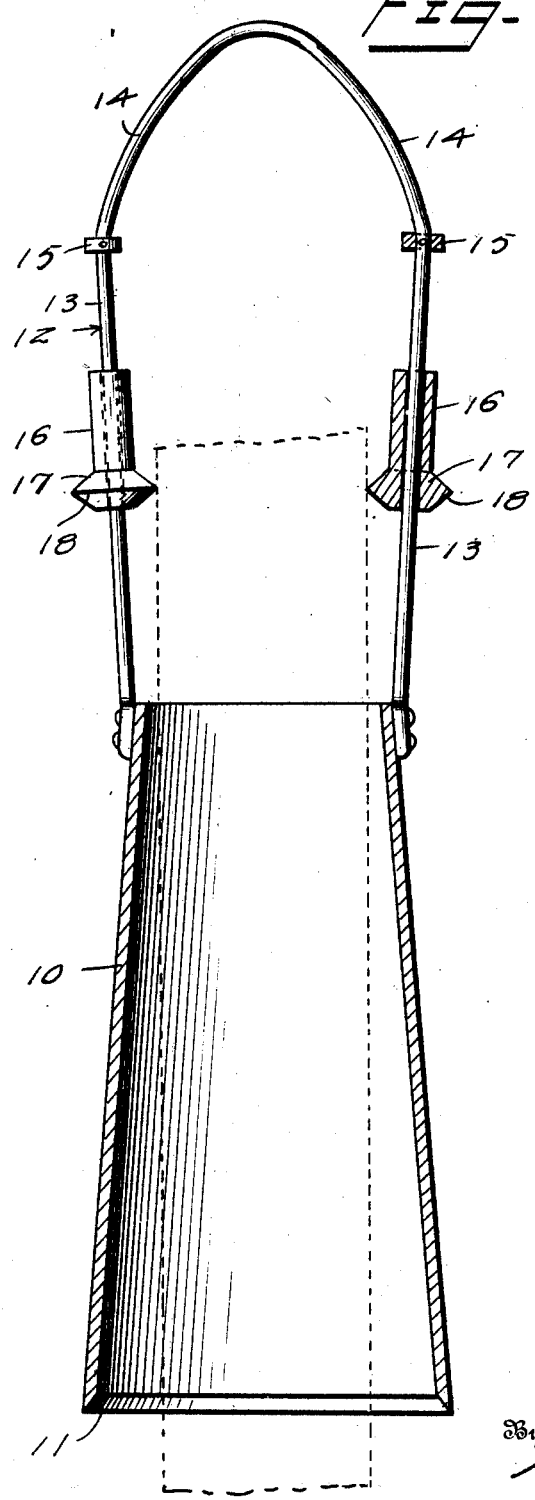
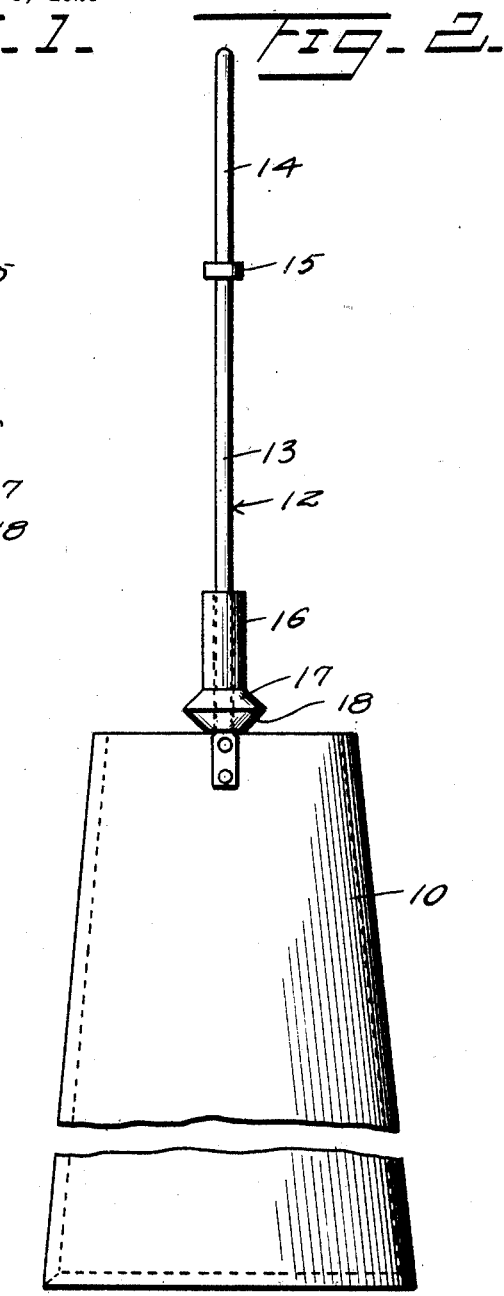
Inventor
E.C.Krueger
By Watson E. Coleman
Attorney Patented Mar. 26, 1929.

1,707,085

UNITED STATES PATENT OFFICE.

EDWARD C. KRUEGER, OF EL DORADO, WISCONSIN.

FISHING TOOL FOR USE IN WELLS.

Application filed May 3, 1928. Serial No. 274,845.

This invention relates to fishing tools for use in wells and more particularly to a device for removing pipe from wells.

An important object of the invention is to produce a device of this character which may be very readily and cheaply manufactured and which will provide an efficient gripping means for engaging the pipe to withdraw it from the well.

A further object of the invention is to provide a device of this character which may be very readily engaged with the pipe or disengaged therefrom.

These and other objects I attain by the construction shown in the accompanying drawings, wherein for the purpose of illustration is shown a preferred embodiment of my invention and wherein:

Figure 1 is a vertical sectional view through a well fishing tool constructed in accordance with my invention;

Figure 2 is a side elevation thereof.

Referring now more particularly to the drawings, the numeral 10 indicates an upwardly tapering tube, the lower end edge of which is beveled, as indicated at 11, so that it will readily pass over a pipe, even though the same be lying against the edge of a well bore. To the upper end of the tube is secured a rigid bail, generally designated at 12. The arms of this bail first diverge upwardly, as indicated at 13, and then converge inwardly, as indicated at 14, to a point where they are connected to one another and adapted for engagement with a hoist line (not herein shown). At the upper ends of the upwardly diverging portions of the arms, stops 15 are provided, and slidable upon these diverging portions are sleeves 16, which may be conveniently formed of small pipe. The lower ends of these sleeves have secured thereto tempered steel disks 17 having tapered ribs 18 at their peripheries.

In the use of the device, it is lowered into the well and engaging over the upper end of the pipe which is being fished for directs the pipe upwardly between the disks 17. The pipe will raise these disks until, by the separation of the arms 13, the ribs 18 escape therefrom, when the disks and their supporting sleeves will drop downwardly to bring the ribs 18 into engagement with the side walls of the pipe. If a pull is then exerted upon the bail 12, the tapered ribs 18 will bite into the side walls of the pipe with increasing force as strain is placed upon the bail finally engaging the same with sufficient force to lift the pipe from its resting place. While only two of the gripping elements are at present illustrated, it will be obvious that the number employed can be increased to any desired extent.

Since the construction hereinbefore set forth is capable of a certain range of change and modification without materially departing from the spirit of the invention, I do not limit myself to such specific structure except as hereinafter claimed.

I claim:—

1. A fishing tool comprising a tube, a bail secured thereto including arms the lower ends of which diverge upwardly, sleeves slidable upon the arms and gripping elements carried by said sleeves.

2. A fishing tool comprising a tube, a bail secured thereto including arms the lower ends of which diverge upwardly, sleeves slidable upon the arms and gripping elements carried by said sleeves, the arms of the bail having stops limiting upward movement of the sleeves thereon.

3. A fishing tool comprising a tube, a bail secured thereto including arms the lower ends of which diverge upwardly, sleeves slidable upon the arms and gripping elements carried by said sleeves, said tube tapering upwardly and at its larger end having a beveled edge.

4. A fishing tool comprising a tube, a bail secured thereto including arms the lower ends of which diverge upwardly, sleeves slidable upon the arms and gripping elements carried by said sleeves, said gripping elements comprising disks having tapering ribs upon their peripheries.

5. A fishing tool comprising a tube, a bail secured thereto including arms the lower ends of which diverge upwardly, sleeves slidable upon the arms, and gripping elements carried by said sleeves, the arms of the bail having stops limiting upward movement of the sleeves thereon, said gripping elements comprising disks having tapering ribs upon their peripheries.

In testimony whereof I hereunto affix my signature.

EDWARD C. KRUEGER.